United States Patent
Hayase et al.

(10) Patent No.: US 11,365,158 B2
(45) Date of Patent: Jun. 21, 2022

(54) HONEYCOMB STRUCTURE AND METHOD OF PRODUCING HONEYCOMB STRUCTURE

(71) Applicant: NGK INSULATORS, LTD., Nagoya (JP)

(72) Inventors: Toru Hayase, Nagoya (JP); Shinji Suzuki, Nagoya (JP); Shinpei Oshima, Nagoya (JP); Takahiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 80 days.

(21) Appl. No.: 16/822,482

(22) Filed: Mar. 18, 2020

(65) Prior Publication Data
US 2020/0308068 A1 Oct. 1, 2020

(30) Foreign Application Priority Data
Mar. 27, 2019 (JP) .............................. JP2019-059801

(51) Int. Cl.
*B01D 46/00* (2022.01)
*C04B 38/00* (2006.01)
(Continued)

(52) U.S. Cl.
CPC ...... *C04B 38/0009* (2013.01); *B01D 46/0001* (2013.01); *B01D 46/2429* (2013.01);
(Continued)

(58) Field of Classification Search
None
See application file for complete search history.

(56) References Cited

U.S. PATENT DOCUMENTS

2006/0154817 A1 7/2006 Nomura et al.
2013/0330530 A1* 12/2013 Okuya .................. A01G 24/46
428/218
(Continued)

FOREIGN PATENT DOCUMENTS

CN 1750879 A 3/2006
JP 2014180654 A * 9/2014
(Continued)

OTHER PUBLICATIONS

Michio Takahashi, machine translation of JP 2014-180654 Abstract and Description, Sep. 29, 2014 (Year: 2014).*
(Continued)

*Primary Examiner* — Mary I Omori
(74) *Attorney, Agent, or Firm* — Burr & Brown, PLLC

(57) ABSTRACT

A honeycomb structure has a plurality of cells formed by a plurality of partition walls. The partition walls are formed of a porous material composed predominantly of cordierite. Each partition wall includes surface layer portions having a porosity of 50% or more and an inside portion having a porosity of 50% or more, the surface layer portions being portions ranging respectively from opposite surfaces to a depth corresponding to 25% of the thickness of the partition wall, and the inside portion being the other portion. The surface layer portions and the inside portion both include pores having axial pore widths of less than 30 μm and pores having axial pore widths of 30 μm or more. A mean axial pore width in the surface layer portions is smaller than a mean axial pore width in the inside portion.

10 Claims, 5 Drawing Sheets

(51) Int. Cl.
  *B01D 46/24* (2006.01)
  *B28B 3/20* (2006.01)
  *C04B 35/195* (2006.01)
  *B01D 53/94* (2006.01)

(52) U.S. Cl.
  CPC .............. *B28B 3/20* (2013.01); *C04B 35/195* (2013.01); *B01D 46/249* (2021.08); *B01D 46/24491* (2021.08); *B01D 46/24492* (2021.08); *B01D 53/94* (2013.01); *B28B 2003/203* (2013.01); *C04B 2235/3481* (2013.01)

(56) References Cited

U.S. PATENT DOCUMENTS

2015/0367335 A1* 12/2015 Okazaki .............. C04B 38/0006
                                                                                                       428/116
2016/0288449 A1   10/2016 Ouchi et al.

FOREIGN PATENT DOCUMENTS

| | | |
|---|---|---|
| JP | 2014-198316 A1 | 10/2014 |
| JP | 2016-190198 A1 | 11/2016 |

OTHER PUBLICATIONS

Chinese Office Action (Application No. 202010199337.5) dated Jun. 28, 2021.

* cited by examiner

HONEYCOMB STRUCTURE AND METHOD OF PRODUCING HONEYCOMB STRUCTURE

TECHNICAL FIELD

The present invention relates to a honeycomb structure for use in filters that capture particulate matter in exhaust gases, and a method of producing the honeycomb structure.

CROSS-REFERENCE TO RELATED APPLICATION

This application claims priority benefit of Japanese Patent Application No. 2019-059801 filed in the Japan Patent Office on Mar. 27, 2019, the entire disclosure of which is incorporated herein by reference.

BACKGROUND ART

Exhaust gases emitted from internal combustion engines such as diesel engines, combustion apparatuses, or other devices contain particulate matter (hereinafter, referred to as "PM") composed predominantly of soot. Therefore, particulate filters for collecting PM are provided in exhaust passages. For example, diesel particulate filters (hereinafter, referred to as "DPFs") or catalyzed soot filters (also referred to as "CSFs") obtained by causing DPFs to support catalysts are provided in exhaust passages of diesel engines. As these filters, porous ceramic honeycomb structures have conventionally been used.

PM is deposited on a filter provided in an exhaust passage. The deposition of PM on the filter causes pressure loss and reduces the operating efficiency of an engine. In view of this, in the case where an exhaust gas is processed continuously over an extended period of time, the filter is detached at regular time intervals for a regeneration process. The regeneration process involves burning and removing PM by supplying a high-temperature gas to the filter in the reverse direction. The regeneration process is also called "back-washing." The regeneration of the filter with a high-temperature gas applies loads on the filter. In the case of a two-layer structured filter including retrofitted surface layers, a repetition of the regeneration process may cause breakage of the surface layer. Even in the case of a filter with no retrofitted surface layers, it is important in terms of a longer lifetime of the filter to reduce the frequency of the regeneration process.

In order to reduce the frequency of the regeneration process, it is preferable that the holes of the filter are enlarged so as to reduce pressure loss caused by the deposition of PM. However, the enlarged holes of the filter can increase the amount of PM passing through the filter.

Japanese Patent Application Laid-Open No. 2016-190198 (Document 1) discloses a technique for making the porosity and pore diameters in surfaces of each partition wall of a honeycomb structure smaller than those in an inside portion of the partition wall by adding anisotropic particles as a bonding assistant to a molding material that is subjected to extrusion molding. This improves durability while suppressing an increase in pressure loss. Examples of Document 1 use silicon carbide (SiC) as an aggregate and metal silicon (Si) or cordierite as a bonding material.

Japanese Patent Application Laid-Open No. 2014-198316 (Document 2) discloses a technique for molding and calcining a honeycomb formed body with use of a molding raw material that includes a pore forming material and a cordierite raw material, then forming a layer on the surface of the calcined honeycomb formed body with use of a sol raw material that includes a cordierite raw material having a lower ratio of pore forming material than the honeycomb formed body, and thereafter firing the honeycomb formed body so as to obtain a honeycomb structure. Accordingly, the honeycomb structure having a low porosity in the surfaces of the partition wall is obtained.

By making the porosity in the surfaces of each partition wall smaller than those in the inside portion of the partition wall as in the honeycomb structures disclosed in Documents 1 and 2, it is possible to reduce the amount of PM passing though the filter while suppressing pressure loss in the filter. However, there is an increasing demand for higher filter performance year by year, and a further improvement in performance is demanded.

SUMMARY OF INVENTION

It is an object of the present invention to provide a new honeycomb structure with improved performance against pressure loss and PM leakage.

A honeycomb structure according to a preferred embodiment of the present invention includes one end face, the other end face, a plurality of partition walls extending in an axial direction from the one end face to the other end face, and a plurality of cell plugs provided on the one end face and the other end face. The plurality of partition walls form a plurality of cells each being a space extending in the axial direction and being arranged in two dimensions when viewed in the axial direction. The plurality of cell plugs seal openings of some of the plurality of cells in the one end face and openings of the remaining cells of the plurality of cells in the other end face. The plurality of partition walls are formed of a porous material composed predominantly of cordierite. Each partition wall between adjacent cells includes surface layer portions having a porosity of 50% or more and an inside portion having a porosity of 50% or more, the surface layer portions being portions ranging respectively from opposite surfaces to a depth corresponding to 25% of a thickness of the partition wall, and the inside portion being the other portion. The surface layer portions include pores having axial pore widths of less than 30 μm and pores having axial pore widths of 30 μm or more, the axial pore widths being widths of pores in the axial direction in a binary image of a section parallel to the axial direction. The inside portion includes pores having axial pore widths of less than 30 μm and pores having axial pore widths of 30 μm or more. A mean axial pore width in the surface layer portions is smaller than a mean axial pore width in the inside portion, the mean axial pore widths being mean pore widths in the axial direction in the binary image. The mean axial pore widths decrease gradually from a center of the partition wall toward the surfaces.

According to the present invention, it is possible to provide a new honeycomb structure with improved performance against pressure loss and PM leakage.

Preferably, in the honeycomb structure, Nsp10>Nip10 and Nsp50<Nip50 are satisfied, where Nsp10 is a percentage of the number of pore widths of less than 10 μm in a distribution of the axial pore widths in the surface layer portions, Nsp50 is a percentage of the number of pore widths of 50 μm or more in the distribution in the surface layer portions, Nip10 is a percentage of the number of pore widths of less than 10 μm in a distribution of the axial pore widths in the inside portion, and Nip50 is a percentage of the number of pore widths of 50 μm or more in the distribution in the inside portion.

More preferably, Nsp10−Nip10≥5 and Nsp50−Nip50≤−4 are further satisfied. Yet more preferably, −30≤Nsp50−Nip50≤−4 is further satisfied. Yet more preferably, Nsp10≥45 and Nip50≥5 are further satisfied.

In a preferred embodiment, the mean axial pore width of pores having axial pore widths of 1 μm or more and 250 μm or less in the inside portion is greater than the mean axial pore width of pores having axial pore widths of 1 μm or more and 250 am or less in the surface layer portions.

More preferably, the mean axial pore width in the inside portion is 17 μm or more, and yet more preferably the mean axial pore width in the inside portion is 20 μm or more.

In a preferred embodiment, the axial pore widths in the surface layer portions are 100 μm or less, and the axial pore widths in the inside portion are 250 μm or less.

In a preferred embodiment, the mean axial pore width of pores having axial pore widths of 50 μm or more in the inside portion is greater than another mean pore width in a direction perpendicular to the axial direction, the another mean pore width being a mean pore width of pores having pore widths of 50 μm or more in the direction perpendicular to the axial direction in the inside portion.

The present invention is also directed to a method of producing the honeycomb structure. The method of producing the honeycomb structure includes kneading a cordierite raw material including a small pore forming material and a large pore forming material to generate a kneaded material while maintaining a state in which the small pore forming material flocculates, molding a honeycomb formed body from the kneaded material by extrusion molding, drying the honeycomb formed body, providing a plurality of cell plugs on the honeycomb formed body, and firing the honeycomb formed body.

These and other objects, features, aspects and advantages of the present invention will become more apparent from the following detailed description of the present invention when taken in conjunction with the accompanying drawings.

DESCRIPTION OF EMBODIMENTS

Figure 1:
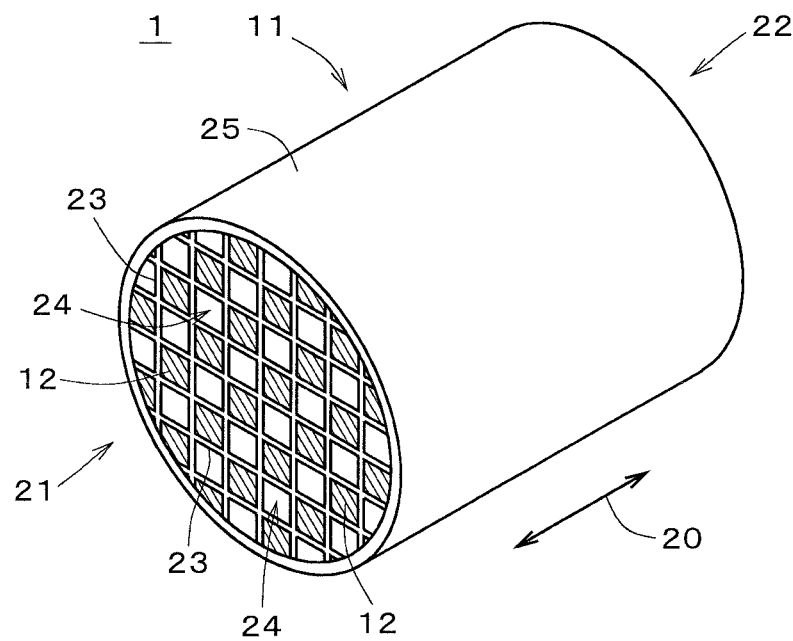
FIG. 1 is a schematic perspective view of a honeycomb structure.
Figure 2:
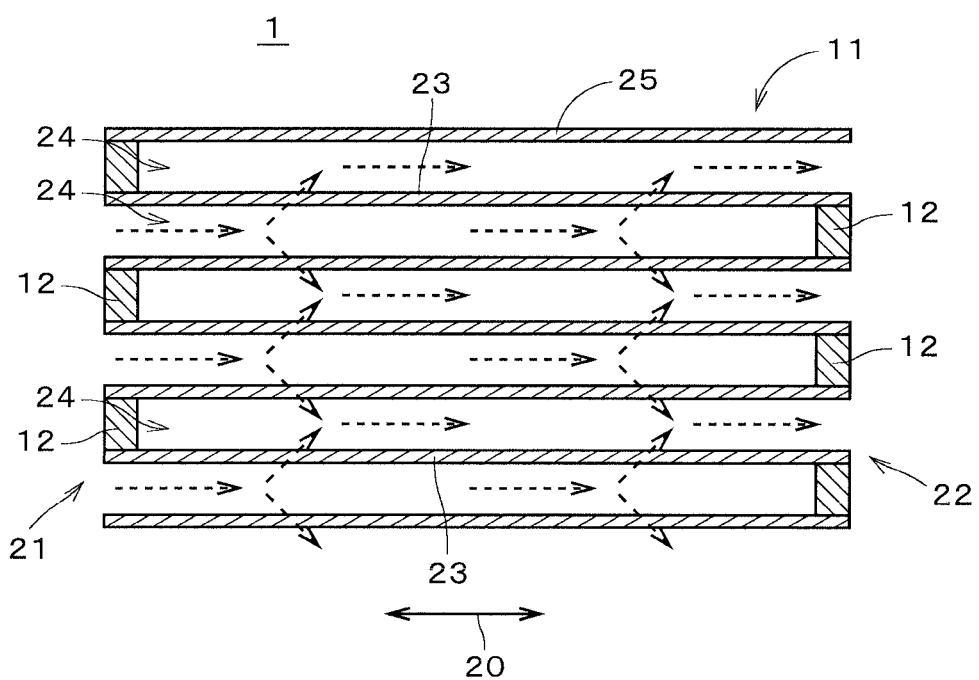
FIG. 2 schematically illustrates a section of the honeycomb structure.

FIG. 1 is a schematic perspective view of a honeycomb structure 1 according to an embodiment of the present invention. FIG. 2 schematically illustrates a section of the honeycomb structure 1. The honeycomb structure 1 includes a honeycomb structure part 11 and cell plugs 12. The cell plugs 12 (or mesh sealing parts) are cross-hatched in FIG. 1. The honeycomb structure part 11 includes an inlet end face 21, which is one end face on the inlet side of exhaust gas, and an outlet end face 22, which is the other end face on the exit side of exhaust gas. The honeycomb structure 1 further includes a plurality of partition walls 23 extending in an axial direction from the inlet end face 21 to the outlet end face 22. In FIGS. 1 and 2 and FIGS. 3 and 4, which will be described later, arrows indicating the axial direction are given a reference sign 20. The plurality of partition walls 23 form a plurality of cells 24 each being a space extending in the axial direction and being arranged in two dimensions when viewed in the axial direction. The outer periphery of the honeycomb structure part 11 forms a tubular outer wall 25 extending in the axial direction. The tubular outer wall 25 has, for example, a circular cross-sectional shape perpendicular to the axial direction, or may have a polygonal or other cross-sectional shape.

The honeycomb structure part 11 including the partition walls 23 is formed of a porous material composed predominantly of cordierite. The porous material is a porous fired body. The term "composed predominantly of cordierite" as used herein is construed as the presence of impurities or residue that could not be transformed into cordierite by firing, and the partition walls 23 normally contains 80% or more by volume of cordierite. Alternatively, other materials may also be intentionally added, and in this case, the partition walls 23 contains 60% or more by volume of cordierite.

The cell plugs 12 are provided to allow the honeycomb structure part 11 to operate as a filter for collecting PM. The cell plugs 12 seal openings of some cells 24 in the outlet end face 22 and openings of the remaining cells 24 in the inlet end face 21. Preferably, the cell plugs 12 are arranged so as to produce complementary checkered patterns on the inlet end face 21 and the outlet end face 22. Instead of the cell plugs 12, a sealing member may be provided so as to be retrofitted to the honeycomb structure part 11. In this case, the honeycomb structure part 11 itself forms the honeycomb structure 1 before having a structure to operate as a filter. That is, the cell plugs 12 are not essential constituent elements of the honeycomb structure 1.

In the honeycomb structure 1, an exhaust gas flowing from the inlet end face 21 into cells 24 passes through partition walls 23 and then flows out from the outlet end face 22 via other cells 24, as indicated by thick broken-line arrows in FIG. 2. When the exhaust gas passes through small cavities, i.e., continuous pores, in the porous partition walls 23, PM contained in the exhaust gas is captured by the partition walls 23 and deposited on the partition walls 23. Thereby, PM is removed from the exhaust gas. The partition walls 23 has a thickness of, for example, 50 micrometers (μm) or more, preferably 100 μm or more, and more preferably 150 μm or more. In order to reduce pressure loss in the partition walls 23, the partition walls 23 may have a thickness of, for example, 500 μm or less, and preferably 450 μm or less.

Figure 3:
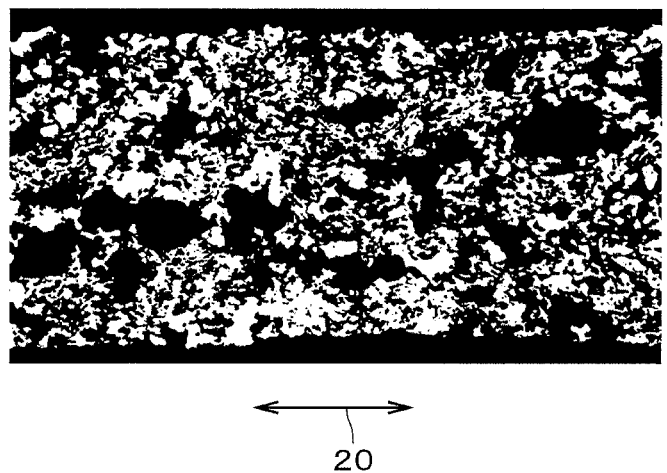
FIG. 3 illustrates a longitudinal section of a partition wall.

FIG. 3 illustrates a longitudinal section of a partition wall 23 between adjacent cells 24. The section is parallel to the axial direction of the honeycomb structure 1 and perpendicular to the partition walls 23. FIG. 3 illustrates a reflection electron image (BEI) that is obtained at 100× magnification with a scanning electron microscope (SEM) and binarized based on a frequency distribution of pixel values. Specifically, the binarization is made by setting a threshold value between two main peaks in the frequency distribution of pixel values. In FIG. 3, pixels with a value of 1 are shown in white, and pixels with a value of 0 are shown in black. In the binary image, the number of pixels with a value of 0 and the number of pixels with a value of 1 vary to some extent depending on the setting of the threshold value, but normally the setting of the threshold value has only a small influence on these numbers because bright and dark portions appear clearly in the porous ceramic section. Pixels with a value of 1 correspond to a framework, and pixels with a value of 0 correspond to pores. In the present embodiment, the binarization is automatically conducted using ImagePro manufactured by NIPPON ROPER Co. Ltd.

Figure 4:
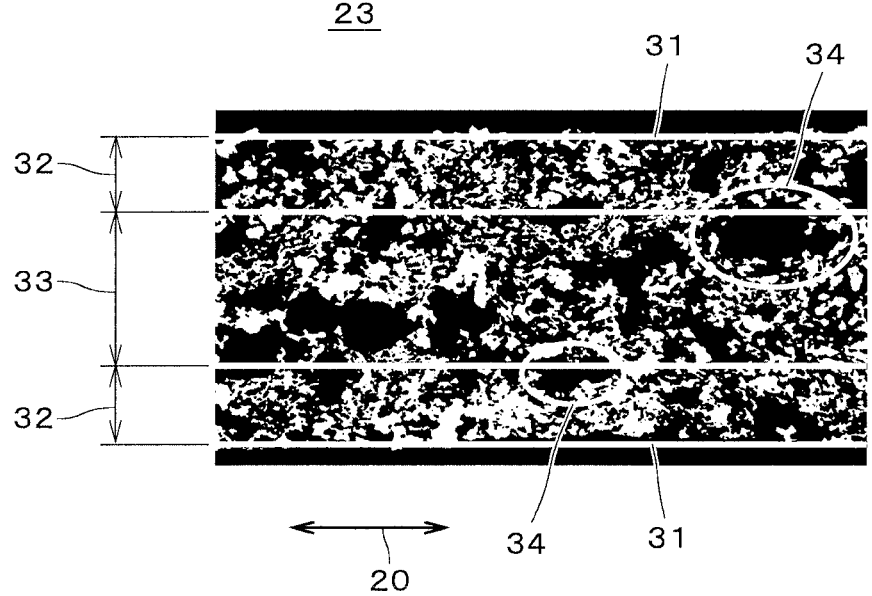
FIG. 4 illustrates surface layer portions and an inside portion.

Here, as illustrated in FIG. 4, portions of each partition wall 23 that range respectively from opposite surfaces 31 to a depth corresponding to 25% of the thickness of the partition wall 23 are referred to as "surface layer portions 32", and the other portion thereof is referred to as an "inside portion 33." The surface layer portions 32 of the partition wall 23 have a porosity of 50% or more, and the inside portion 33 thereof also has a porosity of 50% or more. In this way, the partition wall 23 has high porosities not only in the inside portion but also in the vicinity of the surfaces, as compared with conventional partition walls.

The porosity in the surface layer portions 32 adopts the ratio of the number of pixels with a value of 0 within a 1200 μm by 75 μm range in the above binary image. The porosity in the inside portion 33 adopts the ratio of the number of pixels with a value of 0 within a 1200 μm by 150 μm range in the above binary image.

A mean pore diameter in the surface layer portions 32 of the partition wall 23 is smaller than a mean pore diameter in the inside portion 33. Since pores are continuous small cavities, it is not easy to accurately grasp pore diameters (or small cavity diameters) in the honeycomb structure 1. In view of this, in the present embodiment, a line segment of 1200 μm that extends in the axial direction of the honeycomb structure 1 is defined in the binary image, and a length corresponding to the number of continuous pixels with a value of 0 on this line segment is defined as a pore width in the axial direction at the position concerned. Also, an average value of the numbers of continuous pixels with a value of 0 is adopted as a mean pore width in the axial direction.

In the following description, pore widths and mean pore widths in the axial direction are used as alternatives to pore diameters and mean pore diameters. However, it is conceivable that the magnitude relation of the mean pore diameters in the surface layer portions 32 and the inside portion 33 matches the magnitude relation of the mean pore widths in the axial direction. Therefore, the following description may refer to the magnitude relation of the mean pore diameters on the basis of the magnitude relation of the mean pore widths in the axial direction. In the binary image, pore widths in the axial direction are referred to as "axial pore widths," and mean pore widths in the axial direction are referred to as "mean axial pore widths."

Considering that the lower limit of measurement is normally approximately 1 μm and the partition walls 23 normally have a thickness of several hundred micrometers or less, it is preferable that pores having axial pore widths of 1 μm or more and 250 μm or less are targeted for the calculation of a mean axial pore width. Accordingly, the aforementioned words "a mean pore diameter in the surface layer portions 32 is smaller than a mean pore diameter in the inside portion 33" means more correctly that a mean axial pore width of pores having axial pore widths of 1 μm or more and 250 μm or less in the inside portion 33 is greater than a mean axial pore width of pores having axial pore widths of 1 μm or more and 250 μm or less in the surface layer portions 32. Although the measurement is conducted focusing on the axial direction and therefore the term "mean axial pore width" is used in expression, another mean pore width in a different direction other than the axial direction in the inside portion 33 is also greater than a mean pore width in the surface layer portions 32 in the honeycomb structure 1.

By making the mean axial pore width in the surface layer portions 32 smaller than the mean axial pore width in the inside portion 33, it is possible to keep the pressure loss small and to reduce PM leakage. Besides, since the surface layer portions 32 have a porosity of 50% or more, the honeycomb structure 1 has better performance than in conventional cases. This results in a decrease in the frequency of regeneration of the honeycomb structure 1 and an increase in the lifetime of the honeycomb structure 1. The upper limits of the porosities in the surface layer portions 32 and the inside portion 33 are not particularly limited, but the porosities are preferably 80% or less and more preferably 70% or less from the viewpoint of intensity.

The aforementioned range of pore widths of 1 μm or more and 250 μm or less, used to obtain the mean axial pore widths, is merely a preferable range in order to obtain the mean axial pore widths. This range is chosen because a minimum value of easily measurable pore widths is approximately 1 μm, and if pore widths exceed 250 μm, defects can possibly be included in the measurement. In the partition walls 23 of the honeycomb structure 1, axial pore widths in the surface layer portions 32 are preferably 100 μm or less, and axial pore widths in the inside portion 33 are preferably 250 μm or less.

Meanwhile, as illustrated in FIG. 4, the surface layer portions 32 and the inside portion 33 of the partition wall 23 both includes relatively large pores and relatively small pores. In FIG. 4, only larger pores are indicated by ellipses given a reference sign 34. This structure is obtained as a result of the honeycomb structure part 11 being molded by only extrusion molding, which will be described later. Specifically, the surface layer portions 32 include pores having axial pore widths of less than 30 μm and pores having axial pore widths of 30 μm or more, and the inside portion 33 also includes pores having axial pore widths of less than 30 μm and pores having axial pore widths of 30 μm or more. Although a detailed principle is uncertain, a mean axial pore width of pores having axial pore widths of 50 μm or more in the inside portion 33 is greater than another mean pore width in a direction perpendicular to the axial direction in the inside portion 33, the other mean pore width being a mean pore width of pores having pore widths of 50 μm or more in the direction perpendicular to the axial direction. As will be described later, it is conceivable that this structure is obtained as a result of flocculation of the large pore forming material during extrusion molding. With use of extrusion molding, the upper and lower surface layer portions 32 of the partition wall 23 have almost the same distributions of pore widths and porosities.

Figure 5:
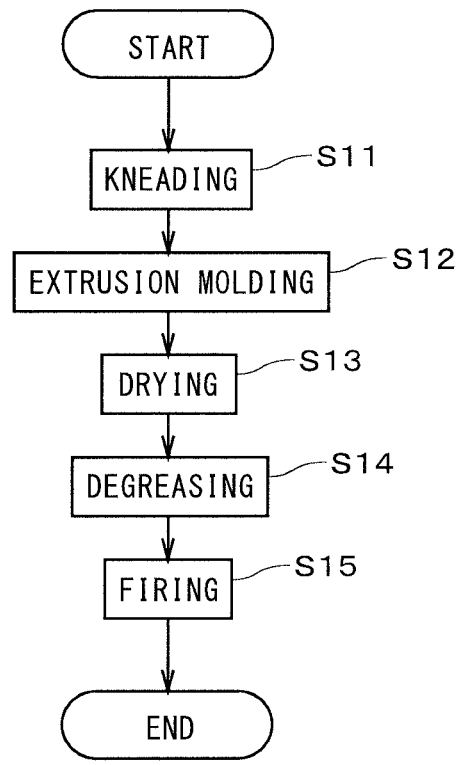
FIG. 5 is a flowchart of the production of the honeycomb structure.

Next, a method of producing the honeycomb structure part 11, which is part of a method of producing the honeycomb structure 1, will be described. FIG. 5 is a flowchart of the production of the honeycomb structure part 11.

First, a kneaded material is generated by kneading a raw material with water and a surface-active agent, the raw material being obtained by adding materials such as an organic binder, a small pore forming material, and a large pore forming material to a cordierite raw material (step S11). The cordierite raw material is, for example, a mixture of talc, kaoline, alumina, silica, and other components. Preferably, the talc has a mean particle diameter of 1 to 50 µm, the kaoline has a mean particle diameter of 0.2 to 20 µm, the alumina has a mean particle diameter of 0.1 to 50 µm, and the silica has a mean particle diameter of 0.1 to 50 µm. Particles of the talc and the kaoline are plate-like.

Examples of the binder include methylcellulose, hydroxypropoxyl cellulose, hydroxyethylcellulose, carboxymethyl cellulose, and polyvinyl alcohol.

Examples of the surface-active agent include anionic surface-active agents, cationic surface-active agents, ampholytic surface-active agents, and nonionic surface-active agents.

Various materials may be used as the pore forming materials, examples of which include polyethylene, silica gel, urethane, acrylic, phenol, polymethyl methacrylate resins (PMMA), carbon, foam resins, and starch. From among the above pore forming materials, the small pore forming material is preferably a material having a mean particle diameter of 0.1 to 20 µm. From among the above pore forming materials, the large pore forming material is preferably a material having a mean particle diameter of 15 to 100 µm. In the kneaded material, a mean particle diameter of the large pore forming material is greater than a mean particle diameter of the small pore forming material. Preferably, the mean particle diameter of the large pore forming material is three times or more greater than the mean particle diameter of the small pore forming material.

In the generation of a kneaded material, kneading is normally conducted so as to disperse various materials included in the raw material as well as possible. However, the present embodiment maintains a state in which the small pore forming material flocculates to some degree in the kneaded material. That is, at the time of generating a kneaded material, kneading has been completed only up to a stage before the small pore forming material is dispersed.

Next, a honeycomb formed body corresponding to the honeycomb structure part 11 is molded by extrusion molding from the kneaded material in which the small pore forming material flocculates (step S12). The extrusion molding uses a base having a desired cell shape, a desired partition wall thickness, and a desired cell density. Although a detailed principle is uncertain, it is conceivable that, in the state in which the small pore forming material flocculates, sliding contact between the base and the kneaded material during extrusion molding causes the small pore forming material to concentrate in the surfaces of the partition walls and allows the large pore forming material to easily gather inside the partition walls. As a result, the resultant honeycomb formed body has a higher ratio of small pore forming material in the surfaces of the partition walls than the ratio of the small pore forming material in the inside portions of the partition walls. In other words, the honeycomb formed body has a lower ratio of large pore forming material in the surfaces of the partition walls than the ratio of the large pore forming material in the inside portions of the partition walls.

Thereafter, the honeycomb formed body is dried (step S13). The drying method is not particularly limited, and examples thereof include hot air drying, microwave drying, dielectric drying, suction drying, vacuum drying, and freeze drying.

Although not shown in FIG. 5, cell plugs are formed on the dried honeycomb formed body. For the formation of the cell plugs, conventionally known methods may be used. For example, the cell plugs are formed by filling desired cells with cell plugging slurry and drying the slurry. The material for the cell plugs is preferably the same as the material used to form the honeycomb formed body. This reduces a difference in thermal expansion between the partition walls 23 and the cell plugs 12 during use of the honeycomb structure 1, and increases the lifetime of the honeycomb structure 1. Alternatively, the cell plugs may be provided separately after firing of the honeycomb formed body.

The dried honeycomb formed body is subjected to degreasing for decomposition of binder when necessary (step S14) and further subjected to firing, i.e., firing, to obtain the honeycomb structure part 11 (step S15). When the firing uses a cordierite raw material, the firing temperature is preferably in the range of 1300 to 1450° C. The firing time during which a maximum temperature is kept is preferably in the range of one to ten hours.

The honeycomb structure 1 obtained by the above-described method is preferably used as microscopic-particle collecting filters for collecting PM contained in exhaust gases emitted from internal combustion engines such as diesel engines or various combustion apparatuses. In particular, the honeycomb structure 1 is preferably adopted by diesel engines of heavy vehicles having large amounts of PM emission. The honeycomb structure 1 achieves a longer lifetime because it has an integral structure obtained by extrusion molding, instead of a two-layer structure including retrofitted surface layers. Besides, as described above, the honeycomb structure 1 can improve performance against pressure loss and PM leakage, as compared to conventional structures, and can achieve a longer lifetime while suppressing the frequency of the regeneration process. In particular, the honeycomb structure 1 does not have the problem that a collecting layer intrudes into a base material, at the time of retrofitting, making it difficult to achieve low pressure loss. Moreover, the production cost can be reduced because only extrusion molding is conducted to obtain the surface layer portions 32 having a small mean pore diameter.

EXAMPLES

Hereinafter, the present invention will be described in more detail with reference to examples, but the present invention is not intended to be limited to these examples.

Table 1 shows the board thickness of the partition walls of the honeycomb structure part, the porosity of the surface layer portions, the mean axial pore width (mean pore width) in the surface layer portions, the porosity of the inside portion, the mean axial pore width (mean pore width) in the inside portion, a reduction ratio of pressure loss caused by PM adhesion (PM-deposit pressure loss reduction ratio) with reference to Comparative Example 1, and a reduction ratio of a PM leakage number (PM leakage number reduction ratio) with reference to Comparative Example 1 according to Comparative Examples 1 and 2 and Examples 1 to 6 (hereinafter collectively referred to as "experimental examples").

TABLE 1

| Experiment Number | Thickness (μm) | Analysis of Surface Layer Image | | Analysis of Inside Image | | PM-Deposit Pressure Loss Reduction Ratio (%) | PM Leakage Number Reduction Ratio (%) |
| --- | --- | --- | --- | --- | --- | --- | --- |
| | | Porosity (%) | Mean Pore Width (μm) | Porosity (%) | Mean Pore Width (μm) | | |
| Comparative Example 1 | 301 | 62 | 22 | 62 | 22 | 0.00 | 0.00 |
| Comparative Example 2 | 280 | 60 | 12 | 59 | 12 | 4.65 | −98.50 |
| Example 1 | 276 | 61 | 9 | 63 | 19 | −6.36 | −90.63 |
| Example 2 | 291 | 60 | 8 | 64 | 23 | −9.10 | −59.05 |
| Example 3 | 278 | 62 | 15 | 63 | 24 | −26.60 | −81.41 |
| Example 4 | 295 | 64 | 15 | 66 | 23 | −37.89 | −85.11 |
| Example 5 | 270 | 56 | 11 | 59 | 17 | −11.56 | −51.51 |
| Example 6 | 283 | 58 | 10 | 62 | 14 | −2.50 | −93.73 |

In Comparative Example 1, a mixture containing a binder, a pore forming material, and other components in addition to a cordierite raw material such as talc, kaoline, alumina, and silica was kneaded with water and a surface-active agent. Only a large pore forming material was used as the pore forming material. As the large pore forming material, a pore forming material with a mean particle diameter of 45 μm was used. In Comparative Example 2 as well, a mixture containing a cordierite raw material, a binder, a pore forming material, and other components was kneaded with water and a surface-active agent. Only a small pore forming material was used as the pore forming material. As the small pore forming material, a pore forming material with a mean particle diameter of 3.5 μm was used.

In Examples 1 to 6, a mixture containing a cordierite raw material, a binder, pore forming materials, and other components was kneaded with water and a surface-active agent. Small and large pore forming materials were used as the pore forming materials.

In Examples 1 and 2, a pore forming material with a mean particle diameter of m was used as the large pore forming material, and a pore forming material with a mean particle diameter of 3.5 μm was used as the small pore forming material. The amount of the large pore forming material in Example 2 is greater than that in Example 1.

In Example 3, a pore forming material with a mean particle diameter of 30 μm was used as the large pore forming material, and a pore forming material with a mean particle diameter of 3.5 μm was used as the small pore forming material. In Example 4, a pore forming material with a mean particle diameter of 45 μm was used as the large pore forming material, and a pore forming material with a mean particle diameter of 8 μm was used as the small pore forming material.

In Examples 5 and 6, the same pore forming materials as those in Examples 1 and 2 were used as the large and small pore forming materials. The amounts of the large and small pore forming materials were set to values between the amounts in Examples 1 and 2. The kneading time in Example 6 was longer than in Example 5.

As will be described later, porosities and mean axial pore widths vary depending on the degree of kneading, and therefore the distributions of porosities and axial pore widths in the surface layer portions and the inside portion after firing, rather than the allocation of the raw materials at the time of production, have a great influence on performance. The distribution of axial pore widths can be regarded as the distribution of pore diameters.

A honeycomb formed body prior to firing, for use in the measurement of the PM-deposit pressure loss and the PM leakage number, was generated so as to have a partition wall thickness of approximately 300 μm and a cell density of 46.5 cells/cm$^2$ after firing. The cells of the honeycomb formed body were made to have a square shape after firing, and the honeycomb formed body was made to have a quadrangular prism shape having square end faces. One side of each end face of the honeycomb formed body having a quadrangular prism shape had a length of 35 mm after firing.

After drying, the honeycomb formed body was cut so as to have an axial length of 100 mm after firing. Thereafter, cell plugs were formed on the honeycomb formed body, and the honeycomb formed body was fired. In this way, a honeycomb structure with 35 mm per side and a length of 100 mm was obtained.

In the measurement of the PM-deposit pressure loss, PM (soot) was deposited to 0.2 g/L (i.e., 0.2 g per volume liter of the honeycomb structure) on the above-described honeycomb structure, and the honeycomb structure was submitted to a small wind-tunnel test. Then, a differential pressure of air between the outlet side and the inlet side at the time when a constant flow rate of ambient-temperature air was given was defined as the PM-deposit pressure loss. The measurement of the PM leakage number measured the number of PM flowing out of the outlet end face of the honeycomb structure at the time when air containing a predetermined amount of PM was supplied to the above-described honeycomb structure.

As indicated by the PM-deposit pressure loss reduction ratio and the PM leakage number reduction ratio in Table 1, Examples 1 to 6 all showed higher performance than Comparative Example 1. Comparative Example 2 using only the small pore forming material showed reduced pore diameters as a whole and accordingly had a smaller PM leakage number than Comparative Example 1, but showed increased PM-deposit pressure loss.

In Comparative Examples 1 and 2, the surface layer portions and the inside portion had the same mean axial pore width, whereas in Examples 1 to 6, the mean axial pore width in the surface layer portions was smaller than the mean axial pore width in the inside portion. This achieved high performance against the PM-deposit pressure loss and the PM leakage number in Examples 1 to 6. Besides, the surface layer portions and the inside portion had higher porosities of 50% or more than in Japanese Patent Application Laid-Open Nos. 2016-190198 and 2014-198316 described above, and this also contributes to a reduction in PM-deposit pressure loss. The porosity of the inside portion was higher than the porosity of the surface layer portions.

Table 2 shows the results of measurement of the relationship between the magnitude of axial pore widths in the surface layer portions and the inside portion and the occurrence frequency according to each experimental example. The range of axial pore widths is divided into three ranges, namely, a range of less than 10 μm, a range of 10 μm or more and less than 50 μm, and a range of 50 μm or more, and the frequency is given for each range. Table 2 also shows a value obtained by subtracting the frequency in the inside portion from the frequency in the surface layer portions for each range.

TABLE 2

| Experiment Number | | Less than 10 μm Frequency % | 10 μm or more and less than 50 μm Frequency % | 50 μm or more Frequency % | Less than 10 μm Difference | 10 μm or more and less than 50 μm Difference | 50 μm or more difference |
|---|---|---|---|---|---|---|---|
| Comparative Example 1 | Surface | 29.8 | 49.1 | 21.1 | 1.7 | −8.6 | 7.0 |
| | Inside | 28.2 | 57.7 | 14.1 | | | |
| Comparative Example 2 | Surface | 63.6 | 33.9 | 2.5 | 2.4 | −3.8 | 1.4 |
| | Inside | 61.2 | 37.7 | 1.2 | | | |
| Example 1 | Surface | 67.8 | 30.8 | 1.4 | 20.3 | −12.8 | −7.5 |
| | Inside | 47.6 | 43.6 | 8.9 | | | |
| Example 2 | Surface | 68.4 | 31.6 | 0.0 | 17.4 | −4.8 | −12.6 |
| | Inside | 51.0 | 36.4 | 12.6 | | | |
| Example 3 | Surface | 51.8 | 43.4 | 4.8 | 14.1 | −5.4 | −8.7 |
| | Inside | 37.6 | 48.8 | 13.5 | | | |
| Example 4 | Surface | 45.8 | 50.9 | 3.2 | 11.5 | −4.9 | −6.6 |
| | Inside | 34.4 | 55.8 | 9.8 | | | |
| Example 5 | Surface | 63.8 | 34.8 | 1.4 | 14.5 | −8.4 | −6.1 |
| | Inside | 49.3 | 43.2 | 7.5 | | | |
| Example 6 | Surface | 55.4 | 43.7 | 0.9 | 6.1 | 1.8 | −7.8 |
| | Inside | 49.3 | 41.9 | 8.8 | | | |

Here, the percentage of the number of pore widths of less than 10 μm in the distribution of axial pore widths in the surface layer portions is expressed as Nsp10(%), the percentage of the number of pore widths of 50 μm or more in the above distribution in the surface layer portions is expressed as Nsp50(%), the percentage of the number of pore widths of less than 10 μm in the distribution of axial pore widths in the inside portion is expressed as Nip10(%), and the percentage of the number of pore widths of 50 μm or more in the above distribution in the inside portion is expressed as Nip50(%).

In Comparative Examples 1 and 2, Nsp10>Nip10 and Nsp50>Nip50, whereas Nsp10>Nip10 and Nsp50<Nip50 in Examples 1 to 6. In this way, Examples 1 to 6 have the feature that the magnitude relation between the frequency of axial pore widths of less than 10 μm and the frequency of axial pore widths of 50 μm or more is reversed between the surface layer portions and the inside portion.

Comparison of Comparative Example 2 and Example 6 shows that Nsp10−Nip10≥5 is assumed to be preferable, and Nsp10−Nip10≥6 is preferable. Comparison of Examples 6 and 4 in consideration of a small PM-deposit pressure loss reduction ratio in Example 6 indicates that Nsp10−Nip10≥10 is more preferable.

Meanwhile, Nsp50−Nip50 is positive in Comparative Examples 1 and 2, but it is −6 or less in Examples 1 to 6. From this, it is estimated that Nsp50−Nip50≤−4 is preferable. Considering Examples 4 and 5, Nsp50−Nip50≤−6 is more preferable, and considering Examples 1 and 6, Nsp50−Nip50≤−7 is yet more preferable. The value of Nsp50−Nip50 is preferably as small as possible, but is practically −30 or higher. That is, −30≤Nsp50−Nip50≤−4. More preferably, −20≤Nsp50−Nip50≤−6. Considering Example 2, Nsp50−Nip50 is preferably −15 or higher.

Considering that Nsp10 in Comparative Example 1 is 29.8, it can be said from Example 4 that Nsp10≥45 is preferable, and Nsp10≥50 is more preferable. Since Nip50 in Comparative Example 2 is 1.2 and small, it is estimated that Nip50≥5 is preferable, and it can be said that Nip50≥7 is more preferable according to Example 5, and Nip50≥8 is yet more preferable according to Examples 1 and 6.

Examples 5 and 6 indicate that the mean axial pore width in the inside portion decreases as the kneading time increases, so that an improvement in performance against the PM-deposit pressure loss is limited. The mean axial pore width in the inside portion is preferably 14 μm or more, and more preferably 17 μm or more. Examples 3 and 4 achieved preferable performance against both the PM-deposit pressure loss and the PM leakage number. From this, it can be said that the mean axial pore width in the inside portion is more preferably 20 μm or more.

Figure 6:
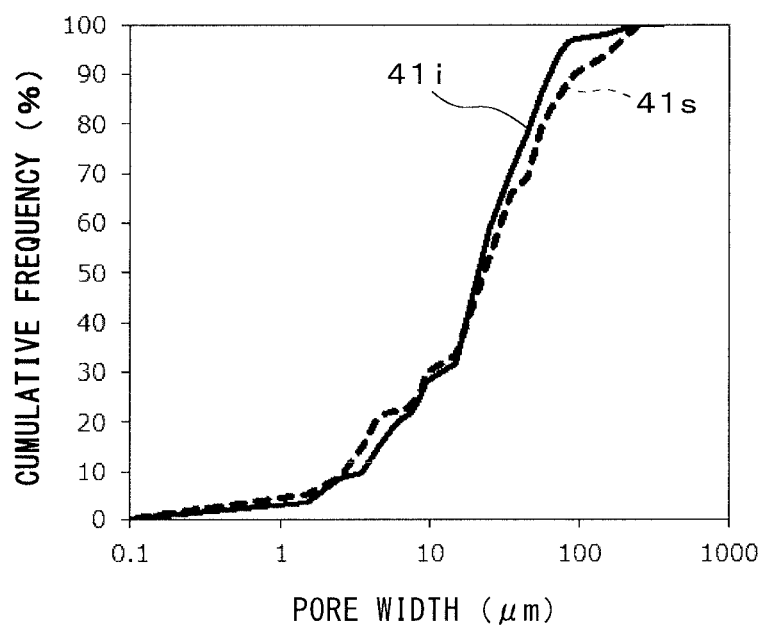
FIG. 6 illustrates a relationship between an increase in pore width and a cumulative frequency according to Comparative Example 1.
Figure 7:
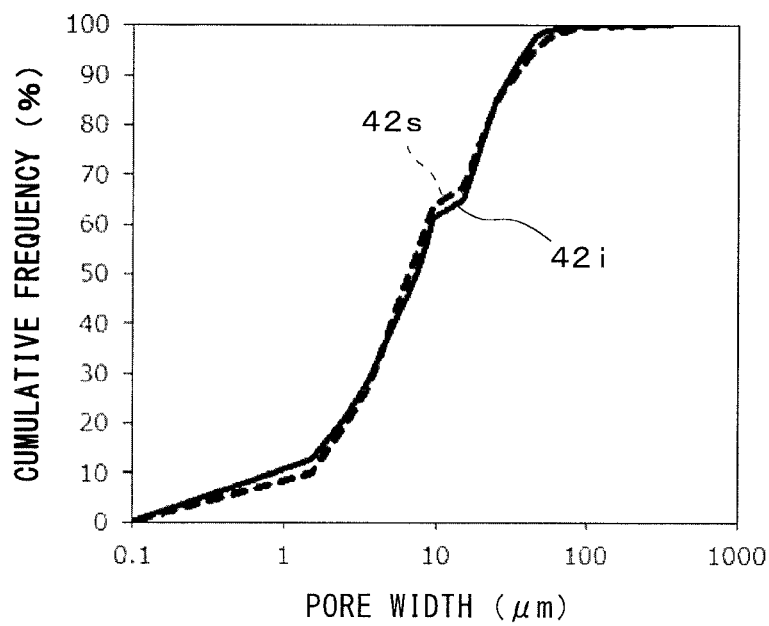
FIG. 7 illustrates a relationship between the increase in pore width and the cumulative frequency according to Comparative Example 2.

FIGS. 6 to 9 respectively illustrate the relationship between an increase in axial pore width (pore width) and a cumulative frequency (%) according to Comparative Examples 1 and 2 and Examples 1 and 3. In FIGS. 6 and 7, broken lines 41s and 42s indicate the cumulative frequency with an increase in axial pore width in the surface layer portions, and solid lines 41i and 42i indicate the cumulative frequency with an increase in axial pore width in the inside portion. FIGS. 6 and 7 indicate that the surface layer portions and the inside portion in Comparative Examples 1 and 2 have almost the same distribution of axial pore widths.

Figure 8:
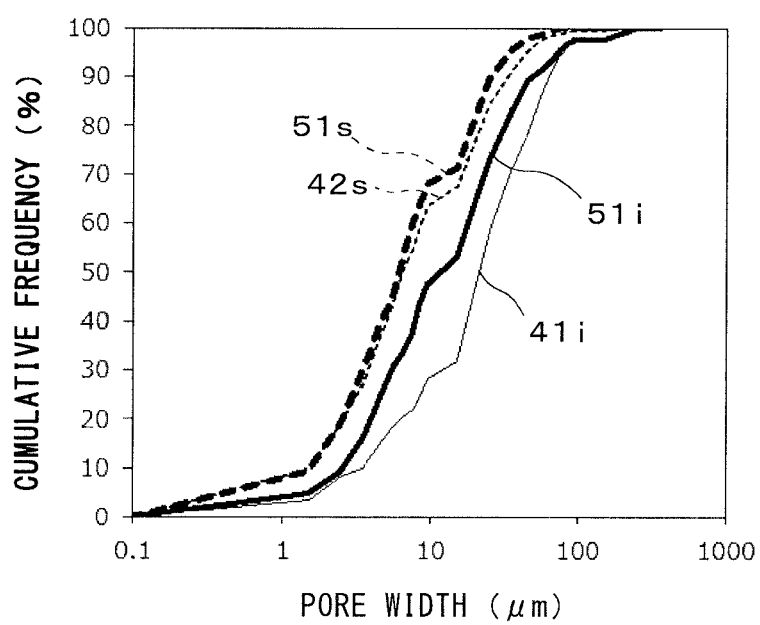
FIG. 8 illustrates a relationship between the increase in pore width and the cumulative frequency according to Example 1.
Figure 9:
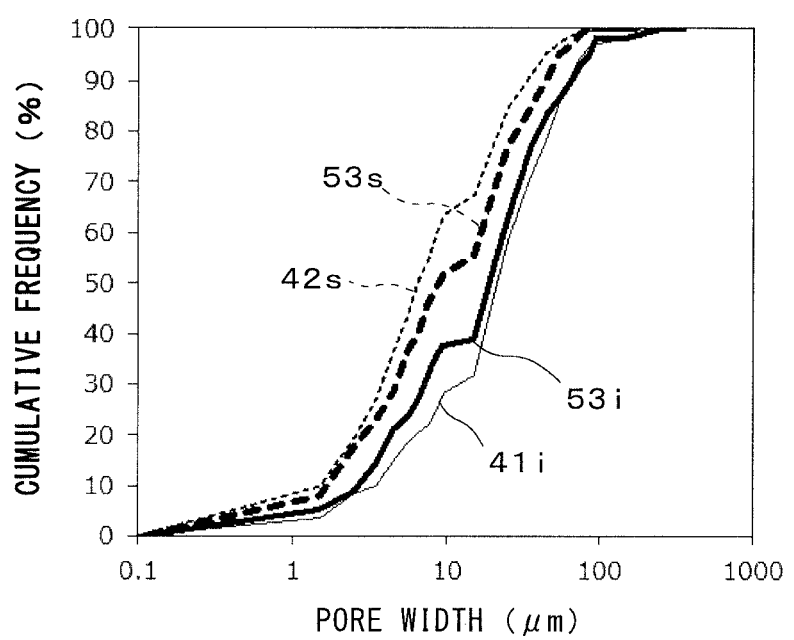
FIG. 9 illustrates a relationship between the increase in pore width and the cumulative frequency according to Example 3.

In FIGS. 8 and 9, thick broken lines 51s and 53s indicate the cumulative frequency with an increase in axial pore width in the surface layer portions, and thick solid lines 51i and 53i indicate the cumulative frequency with an increase in axial pore width in the inside portion. A thin broken line 42s indicates the cumulative frequency with an increase in axial pore width in the surface layer portions according to Comparative Example 2, and a thin solid line 41i indicates the cumulative frequency with an increase in axial pore width in the inside portion according to Comparative Example 1. FIGS. 8 and 9 indicate that in Examples 1 to 3, the structure of the surface layer portions, rather than the structure of the inside portion, is similar to that in Comparative Example 2, and the structure of the inside portion, rather than the structure of the surface layer portions, is similar to that in Comparative Example 1. It is also found that in Examples 1 and 3, the surface layer portions have a high frequency of small axial pore widths, and the inside portion has a high frequency of large axial pore widths, while both the surface layer portions and the inside portion include axial pore widths of various magnitudes.

In FIGS. 8 and 9, the angles of inclination of the graph for the surface layer portions and the inside portion are always positive. This indicates that both the surface layer portions and the inside portion include axial pore widths of various sizes, and at least the surface layer portions include pores having axial pore widths of less than 30 µm and pores having axial pore widths of 30 µm or more, and the inside portion also includes pores having axial pore widths of less than 30 µm and pores having axial pore widths of m or more. This is because the entire structure is integrally molded by extrusion molding. For similar reasons, the surface layer portions and the inside portion are composed of the same elements. However, the ratios of the elements may vary. While the cumulative frequencies of the axial pore widths are illustrated in FIGS. 8 and 9, the frequency distribution of the axial pore widths in the surface layer portions is sharper than the frequency distribution of the axial pore widths in the inside portion.

Since each partition wall is integrally molded as a whole by extrusion molding, a mean axial pore width gradually decreases from the center of the partition wall toward the surfaces, i.e., from an intermediate position located between the opposite surfaces of the partition wall toward the surfaces. When a honeycomb structure has a conventional two-layer structure including retrofitted surface layers, a mean axial pore width changes considerably at the boundary between the surface layers and the inside portion. In the case of the partition walls of the honeycomb structure according to the present invention, a mean axial pore width decreases more smoothly from the inner side to the outer side than in the case of the partition walls having a two-layer structure. Of course, the above comparison regarding changes in the mean axial pore width is a comparison for the case where the inside portion of each partition wall is taken in broad perspective, and the mean axial pore width substantially decreases gradually from the center of the partition wall toward the surfaces. The position in the center of the partition wall does not necessarily have to be a center between the opposite surfaces in a strict sense.

The honeycomb structure 1 and the method of producing the honeycomb structure described above may be modified in various ways.

The honeycomb structure 1 may further include other layers formed separately on the surfaces for the purpose of assisting collection or for other purposes.

The shape of the honeycomb structure 1 is not limited to the shape illustrated in FIG. 1. For example, the outside shape of the end faces may be circular, oval, or polygonal. A sectional shape of the cells perpendicular to the axial direction may also be circular or polygonal such as square or hexagonal.

The processing for obtaining axial pore widths in the surface layer portions 32 and the inside portion 33 does not necessarily have to be conducted on a single straight line extending in the axial direction, and may be conducted on a plurality of straight lines extending in the axial direction.

The types of raw materials, the mixture ratio of raw materials, the kneading method, and the extrusion molding method in the production of the honeycomb structure 1 may be modified in various ways as long as extrusion molding is conducted in a state in which the large pore forming material flocculates.

The configurations of the preferred embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1 Honeycomb structure
20 Axial direction
21 Inlet end face (one end face)
22 Outlet end face (other end face)
23 Partition wall
24 Cell
32 Surface layer portion
33 Inside portion
S11 to S15 Step

The invention claimed is:

1. A honeycomb structure comprising:
one end face;
an other end face;
a plurality of partition walls extending in an axial direction from said one end face to said other end face; and
a plurality of cell plugs provided on said one end face and said other end face,
wherein said plurality of partition walls form a plurality of cells, wherein each cell of said plurality of cells being a space extending in said axial direction and being arranged in two dimensions when viewed in said axial direction,
said plurality of cell plugs seal openings of some of said plurality of cells in said one end face and openings of remaining cells of said plurality of cells in said other end face,
said plurality of partition walls are formed of a porous material composed predominantly of cordierite,
each partition wall of said plurality of partition walls between adjacent cells of said plurality of cells includes surface layer portions having a porosity of 50% or more and an inside portion having a porosity of 50% or more, the surface layer portions being portions ranging respectively from opposite surfaces to a depth corresponding to 25% of a thickness of each partition wall of said plurality of partition walls, and the inside portion being an other portion,
said surface layer portions include pores having axial pore widths of less than 30 µm and pores having axial pore widths of 30 µm or more, the axial pore widths being widths of pores in said axial direction in a binary image of a section parallel to said axial direction,
said inside portion includes pores having axial pore widths of less than 30 µm and pores having axial pore widths of 30 µm or more,
a mean axial pore width in said surface layer portions is smaller than a mean axial pore width in said inside portion, said mean axial pore width in said surface layer portions and said mean axial pore width in said inside portion being mean pore widths in said axial direction in said binary image,
said mean axial pore width in said surface layer portions and said mean axial pore width in said inside portion decrease gradually from a center of said each partition wall toward the opposite surfaces, and wherein Nsp10>Nip10 and Nsp50<Nip50 are satisfied, where Nsp10 is a percentage of a number of pore widths of less than 10 μm in a distribution of said axial pore widths in said surface layer portions, Nsp50 is a percentage of a number of pore widths of 50 μm or more in said distribution in said surface layer portions, Nip10 is a percentage of a number of pore widths of less than 10 μm in a distribution of said axial pore widths in said inside portion, and Nip50 is a percentage of a number of pore widths of 50 μm or more in said distribution in said inside portion.

2. The honeycomb structure according to claim 1, wherein Nsp10−Nip10≥5 and Nsp50−Nip50≤−4 are further satisfied.

3. The honeycomb structure according to claim 1, wherein −30≤Nsp50−Nip50≤−4 is further satisfied.

4. The honeycomb structure according to claim 1, wherein Nsp10≥45 and Nip50≥5 are further satisfied.

5. The honeycomb structure according to claim 1, wherein said mean axial pore width of pores having axial pore widths of 1 μm or more and 250 μm or less in said inside portion is greater than said mean axial pore width of pores having axial pore widths of 1 μm or more and 250 μm or less in said surface layer portions.

6. The honeycomb structure according to claim 1, wherein said mean axial pore width in said inside portion is 17 μm or more.

7. The honeycomb structure according to claim 6, wherein said mean axial pore width in said inside portion is 20 μm or more.

8. The honeycomb structure according to claim 1, wherein said axial pore widths in said surface layer portions are 100 μm or less, and
said axial pore widths in said inside portion are 250 μm or less.

9. A honeycomb structure comprising:
one end face;
an other end face;
a plurality of partition walls extending in an axial direction from said one end face to said other end face; and
a plurality of cell plugs provided on said one end face and said other end face,
wherein said plurality of partition walls form a plurality of cells, wherein each cell of said plurality of cells being a space extending in said axial direction and being arranged in two dimensions when viewed in said axial direction,
said plurality of cell plugs seal openings of some of said plurality of cells in said one end face and openings of remaining cells of said plurality of cells in said other end face,
said plurality of partition walls are formed of a porous material composed predominantly of cordierite,
each partition wall of said plurality of partition walls between adjacent cells of said plurality of cells includes surface layer portions having a porosity of 50% or more and an inside portion having a porosity of 50% or more, the surface layer portions being portions ranging respectively from opposite surfaces to a depth corresponding to 25% of a thickness of each partition wall of said plurality of partition walls, and the inside portion being an other portion,
said surface layer portions include pores having axial pore widths of less than 30 μm and pores having axial pore widths of 30 μm or more, the axial pore widths being widths of pores in said axial direction in a binary image of a section parallel to said axial direction,
said inside portion includes pores having axial pore widths of less than 30 μm and pores having axial pore widths of 30 μm or more,
a mean axial pore width in said surface layer portions is smaller than a mean axial pore width in said inside portion, said mean axial pore width in said surface layer portions and said mean axial pore width in said inside portion being mean pore widths in said axial direction in said binary image,
said mean axial pore width in said surface layer portions and said mean axial pore width in said inside portion decrease gradually from a center of said each partition wall toward the opposite surfaces,
wherein said mean axial pore width of pores having axial pore widths of 50 μm or more in said inside portion is greater than another mean pore width in a direction perpendicular to said axial direction, said another mean pore width being a mean pore width of pores having pore widths of 50 μm or more in the direction perpendicular to said axial direction in said inside portion.

10. A method of producing the honeycomb structure according to claim 1, comprising:
kneading a cordierite raw material including a small pore forming material and a large pore forming material to generate a kneaded material while maintaining a state in which said small pore forming material flocculates;
molding a honeycomb formed body from said kneaded material by extrusion molding;
drying said honeycomb formed body;
providing the plurality of cell plugs on said honeycomb formed body; and
firing said honeycomb formed body.

* * * * *